United States Patent Office 3,446,678
Patented May 27, 1969

---

3,446,678
PROCESS FOR HEAT WORKING METALS
Hans Messer, Konigstein, Taunus, Germany, assignor to Messer Griesheim GmbH, Frankfurt am Main, Germany, a corporation of Germany
No Drawing. Filed July 8, 1966, Ser. No. 563,718
Claims priority, application Germany, July 17, 1965, M 66,005
Int. Cl. B23k 7/08
U.S. Cl. 148—9    3 Claims This invention relates to a process for heating, melting, cutting, or soldering metal work pieces; and more particularly to the type of gas mixture of such process.

As indicated above, the invention relates to a gas mixture for the heating and melting of metal work pieces, especially for cutting thick-walled objects, and also for soldering. For such work processes it is known to use an acetylene-air mixture in order to decrease the high flame temperature, the speed of combustion, and the output of an acetylene-oxygene mixture. In these processes the addition of air serves as a ballasting agent. It has been shown that the addition of air has various disadvantages.

In most instances, acetylene torches, equipped for receiving a supply of air, are connected to the compressed air ring conduit existing in almost every plant. The conduit ordinarily has a pressure in its operating condition, which is higher than the acetylene pressure. However, acetylene can enter the conduit in the decrease or the absence of pressure in the compressed air conduit, thus creating dangerous conditions. For example acetylene-air mixtures are known to create an explosive mixture which can explode even with the slightest temperature increase, e.g. by outside influence or shock. This explosive mixture can occur even with as low as 3% air constituent in the acetylene form. On the other hand even a slight content of acetylene in the air results in the same dangers.

Furthermore, the addition of air or pure nitrogen to the acetylene has the disadvantage that, in using acetylene-air- or acetylene-nitrogen-oxygen flame in processes where a liquid metal results, the nitrogen can react with the metal producing poor metallurgical results. It is also known that the addition of nitrogen to liquid melts, considerably increases their pore occurrence.

An object of this invention is to provide a process which avoids the above noted difficulties and disadvantages.

According to the invention, a gas mixture is proposed, in order to avoid these disadvantages, which consists of acetylene and argon. Although argon has been used as a shielding gas in certain welding processes, acetylene-argon mixtures have previously not been known. Furthermore, the danger of an acetylene-air mixture has been taken into consideration with this invention. For example research by the applicant has shown that the formation of acetylene-air mixtures is often the cause of explosions. With the inventive proposal, it is possible to avoid these explosions with certainty. Additionally by using an acetylene-argon mixture it is possible to provide a torch device which can operate independently of compressed air conduits. This also makes a special purification of the compressed air superfluous, since the unavoidable admixture of moisture and oil in the use as welding gas must definitely be precipitated.

The admixture of argon to acetylene has the further advantage that this mixture can be employed for all metallurgical processes, since argon does not react with the melts, as does for example nitrogen. This is also of importance if the work piece surfaces must be intensely heated, since even then a reaction of the material with the welding gas can set in. Example: A sheet of steel of 100 mm. thickness was cut with a mixture consisting of 400 litre acetylene, 100 litre argon and about 400 litre oxygen, whereby a perfect cut with sharp edges and smooth cutting surfaces resulted.

It is noted that in the claims the term "heat working" is used to designate various types of heat working, such as heating, melting, cutting and soldering.

Obviously, many modifications and variations of the above invention are possible in light of the above teachings. It is therefore to be understood that within the scope of the appended claims the invention may be practiced otherwise than as specifically described.

What is claimed is:
1. In a process for heat working metal pieces, said process including mixing acetylene gas with another gas to form a working gas mixture and applying the working gas mixture against the workpieces to effect the heat working thereof, the improvement comprising mixing argon with the acetate to form the working gas mixture.
2. A process for heat working metal pieces as set forth in claim 1, including mixing oxygen with the acetylene and argon.
3. A process for heat working metal pieces as set forth in claim 2, including using the oxygen and acetylene in substantially equal amounts, with the equal amounts being substantially four times the amount of argon.

References Cited
UNITED STATES PATENTS
3,255,802    6/1966    Browning _____ 431—4

L. DEWAYNE RUTLEDGE, *Primary Examiner.*
W. W. STALLARD, *Assistant Examiner.*

U.S. Cl. X.R.
48—197; 148—9.5, 9.6; 431—4